(12) United States Patent
Aoishi

(10) Patent No.: US 6,987,642 B2
(45) Date of Patent: Jan. 17, 2006

(54) CHUCKING MECHANISM OF CENTER CORE OF DISK CARTRIDGE

(75) Inventor: Harumi Aoishi, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 98 days.

(21) Appl. No.: 10/656,176

(22) Filed: Sep. 8, 2003

(65) Prior Publication Data

US 2004/0047071 A1    Mar. 11, 2004

(30) Foreign Application Priority Data

Sep. 10, 2002   (JP) .............................. 2002-264205

(51) Int. Cl.
*G11B 17/022*   (2006.01)
(52) U.S. Cl. .................................................. 360/99.12
(58) Field of Classification Search ............. 360/99.05, 360/99.12
See application file for complete search history.

(56) References Cited

U.S. PATENT DOCUMENTS

| | | | | |
|---|---|---|---|---|
| 4,149,207 A | * | 4/1979 | Porter et al. ............. | 360/99.05 |
| 4,497,003 A | * | 1/1985 | Abe et al. ................ | 360/99.12 |
| 4,742,419 A | * | 5/1988 | Kato .......................... | 360/133 |
| 5,050,158 A | * | 9/1991 | Kitada et al. ................ | 720/710 |
| 5,257,152 A | * | 10/1993 | Nagase .................... | 360/99.08 |

* cited by examiner

Primary Examiner—Robert S. Tupper
(74) Attorney, Agent, or Firm—Sughrue Mion, PLLC

(57) ABSTRACT

Faulty engagement due to low surface precision of the engaging surfaces of a center core of a disk cartridge and a drive spindle is resolved. The center core 10 is positioned on the drive spindle 20 in a state where the center core 10 is in point contact with the drive spindle 20 at a minimum of three spots upon chucking. A minimum of three protrusions 10*d* are provided on the bottom surface of the center core 10, and lower ends P of the protrusions 10*d* are in point contact with the upper surface 21*a* of the drive spindle 20.

4 Claims, 4 Drawing Sheets

CHUCKING MECHANISM OF CENTER CORE OF DISK CARTRIDGE

BACKGROUND OF THE INVENTION

1. Field of the Invention

The present invention relates to a chucking mechanism of a center core of a disk cartridge to receive a drive spindle, the center core being fixed to the center of a disk, which serves as a recording medium and is rotatably housed in a housing of the disk cartridge, which is of the type that is employed in a disk drive provided with the drive spindle.

2. Description of the Related Art

Recording media, e.g., a micro-magnetic disk cartridge called "clik! (registered trademark)" have been conventionally used for mobile equipment such as digital cameras.

FIGS. 4A to 4C are a plan view, a right side view and a bottom plan view of a magnetic disk cartridge 1, respectively. As shown in these Figures, a flat housing of the magnetic disk cartridge 1 rotatably contains a magnetic disk 5. The flat housing is constituted of a resin frame 2 which includes a pressing portion 2a, and upper and lower shells 3 and 4 which are made of thin metal plates. The dimensions of the housing are 50 mm wide by 55 mm deep by 1.95 mm thick. The magnetic disk 5 has a storage capacity of 40 MB and a diameter of 1.8 inches (45.7 mm).

The magnetic disk cartridge 1 is constituted so as to be inserted and placed into a slot of a Type II PC card drive which has the dimensions of 53 mm wide by 85 mm deep by 5 mm thick. This disk drive is provided with a spindle motor and a magnetic head. The spindle motor includes a drive spindle which magnetically attracts a center core 10 of the magnetic disk 5, and the magnetic head which accesses to the surface of the rotating magnetic disk 5 to record and reproduce information.

A V-shaped opening 6 is formed in the housing of the magnetic disk cartridge 1 for the magnetic head of the disk drive to access the surface of the magnetic disk 5. A rotary shutter 7, which is urged toward a closed position by a spring member, opens and closes the opening 6. The rotary shutter 7 is locked at a closed position shown in FIGS. 4A and C by a shutter locking member 11 provided in the housing.

A notch 8 is formed on the top portion of the left side of the housing to engage with an engaging member of the disk drive to ensure the positioning of the magnetic disk cartridge 1 in the disk drive. On the top portion of the right side surface, a small window 9 is formed so that the shutter locking member 11 faces outside. The shutter locking member 11 is constituted to be pressed by a lock releasing member provided in the disk drive to release the lock on the rotary shutter 7 when the magnetic disk cartridge 1 is inserted into the disk drive.

A circular opening 4a and an arcuate groove 4b are formed in the lower shell 4 of the housing. The opening 4a is for the drive spindle of the disk drive to engage with the center core 10 of the magnetic disk 5, and the arcuate groove 4b is concentric with the rotary shutter 7. A shutter knob 7b is attached to the rotary shutter 7. The shutter knob 7b protrudes from the arcuate groove 4b and moves along the arcuate groove 4b to open and close the rotary shutter 7.

FIG. 5 is a sectional view showing the center core 10 as well as a drive spindle 20. The center core 10 provided with a center aperture 10a is formed from an iron based metal material. The magnetic disk 5 is affixed to a flat upper surface 10b (adhesion surface) of the center core, and a bottom surface 10c (engaging surface) engages with the drive spindle 20.

Meanwhile, the drive spindle 20 is provided with the main body of a spindle 21 and a magnet 22. The main body of the spindle 21 is the core, and the magnet 22 magnetically attracts the center core 10. A flat upper surface 21a (engaging surface) of the main body of the spindle 21 engages with the center core 10. The drive spindle 20 is constituted as follows: when the magnetic disk cartridge 1 is placed in the disk drive, the magnet 22 attracts the center core 10 onto the main body of the spindle 21; and the center core 10 engages with the drive spindle 20 in a state where the surfaces 10c and 21a are in contact with each other.

However, in the case where the center core 10 and the drive spindle 20 are engaged in a state where the surfaces 10c and 21a are in contact as described above, there were times when the center core 10 was engaged with the drive spindle 20 in a slanted state, when the surface precision of the engaging surface 10c of the center core 10 is low. In this case, parallelism between the rotation surface of the drive spindle 20 and the rotation surface of the magnetic disk 5 is reduced. Accordingly, wobbling of the magnetic disk 5 surface increases when the drive spindle 20 rotates. Thus, there has been a problem that recording/reproducing characteristics are aversely affected.

Moreover, it is extremely difficult to maintain the surface precision of the engaging surface 10c of the center core 10. This has been reducing the material utilization rate for the center core 10 and increasing manufacturing costs of the center core 10.

SUMMARY OF THE INVENTION

In consideration of the aforementioned circumstance, an object of the present invention is to provide a chucking mechanism in which faulty engagement due to low surface precision of the engaging surfaces of the conventional center core and the drive spindle is effectively resolved.

The present invention is a chucking mechanism of a center core in a disk cartridge for receiving a drive spindle. A housing of the disk cartridge rotatably contains a disk serving as a recording medium. The disk has a center core fixed to the center thereof. The disk cartridge is placed in a disk drive provided with the drive spindle.

The chucking mechanism is characterized by the center core being positioned on the drive spindle upon chucking in a state where the center core is in point contact with the drive spindle at a minimum of three locations.

Although the constitution can be achieved by providing a minimum of three protrusions on the bottom surface of the center core and causing these protrusions to be in point contact with the upper surface of the drive spindle, the protrusions can be provided on the drive spindle. The shape of the protrusions is preferably conical or hemispherical. In addition, to balance the attraction by the magnet, a minimum of three protrusions arranged in a circle about the axis at regular intervals are preferred. In other words, an angular interval of 120° is maintained when there are three protrusions. Furthermore, an angular interval of 90° is preferred to be maintained when there are four protrusions.

Additionally, the protrusions are most preferably cut to be formed integral with the center core. However, the protrusions can be provided separate from the center core and made of resin or rubber. Furthermore, dents can be provided on the upper surface of the drive spindle facing the protrusions of the center core to receive the lower ends of the protrusions at the bottom surfaces of the dents.

According to the present invention, the center core is positioned on the drive spindle in a state where the center core is in point contact with the drive spindle at a minimum of three spots. Thus, faulty engagement due to insufficient surface precision of the conventional center core is resolved. Therefore, the material utilization rate of the center core is improved, and manufacturing costs thereof can be reduced.

Moreover, the constitution has an effect that the parallelism is not reduced even when foreign matter is sandwiched between the center core and the drive spindle. In addition, a vibration suppression effect can be obtained by forming the protrusions from rubber.

Furthermore, the reception of the lower ends of the protrusions at the bottom surfaces of the dents can prevent positional displacement of the center core on the drive spindle.

DESCRIPTION OF THE PREFERRED EMBODIMENTS

Embodiments of the present invention are described in detail below with reference to the drawings.

Figure 1A:
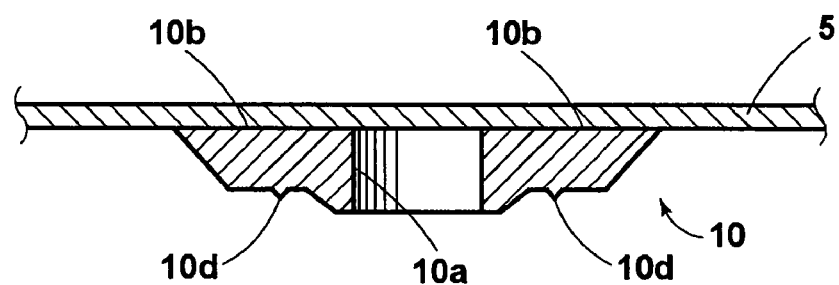
FIGS. 1A and 1B are a sectional view and a bottom plan view of a center core used in a chucking mechanism of the present invention, respectively.
Figure 1B:
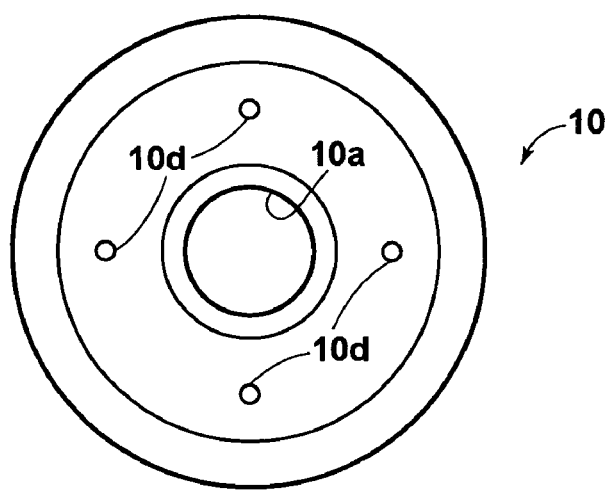

FIGS. 1A and 1B are a sectional view and a bottom plan view of a center core used in a chucking mechanism of the present invention.

A center core 10 provided with a center aperture 10a is formed from an iron based metal material. A magnetic disk 5 is affixed to a flat upper surface (adhesion surface 10b) of the center core 10, and four conical protrusions 10d are protrusively provided on the center core 10. These four protrusions 10d are arranged in a circle about an axis at angular intervals of 90°.

Figure 2:
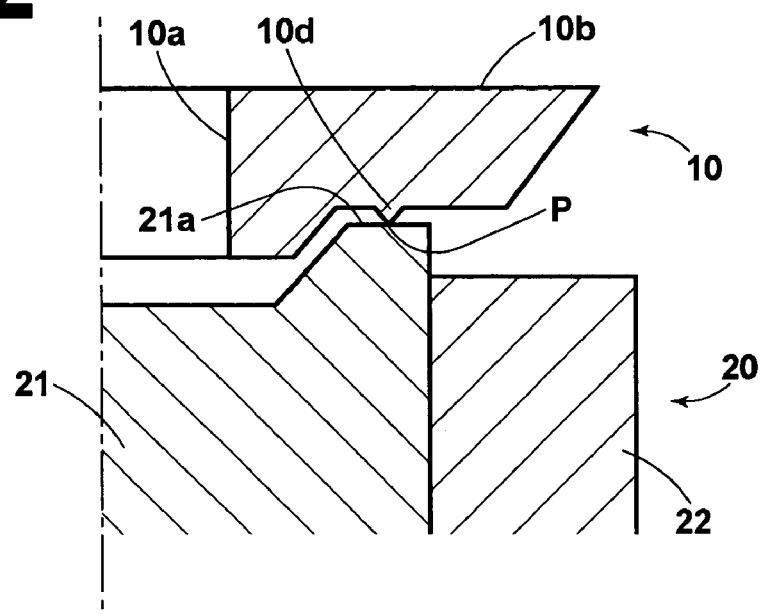
FIG. 2 is an enlarged sectional view of an essential part showing a state where the center core of FIG. 1 is engaged with a drive spindle.

FIG. 2 is an enlarged sectional view of an essential part showing a state where the center core 10 of FIG. 1 is engaged with a drive spindle 20.

Figure 5:
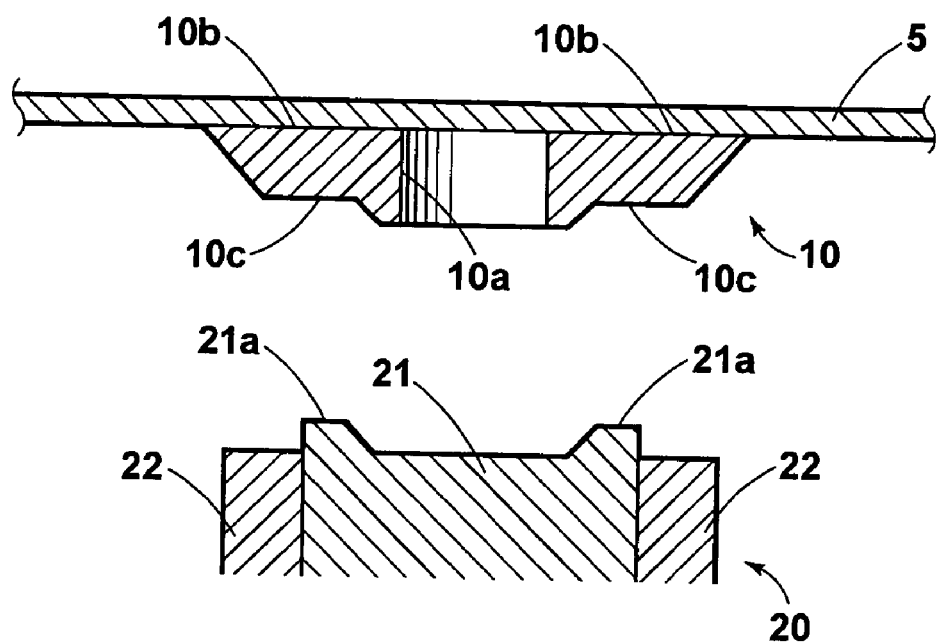
FIG. 5 is a sectional view showing a center core of the disk cartridge of FIG. 4 as well as a drive spindle.

The drive spindle 20 is provided with a main body of a spindle 21 and a magnet 22. The main body of the spindle 21 is the core, and the magnet 22 magnetically attracts the center core 10. Similar to the constitution shown in FIG. 5, a flat upper surface 21a (engaging surface) of the main body of the spindle 21 engages with the center core 10. However, in the present embodiment, the lower ends P of the conical protrusions 10d of the center core 10 are in point contact with the upper surface 21a of the main body of the spindle 21. When the center core 10 is used in "clik! (registered trademark)", the diameter of the portion of the protrusions 10d, which are in contact with the bottom surface of the center core 10, is preferably 0.5 to 2 mm. The height of the protrusions 10d is preferably approximately 0.2 to 1 mm.

As described above, in the present embodiment, the lower ends P of the four protrusions 10d formed on the bottom surface of the center core 10 are in point contact with the upper surface of the main body of the spindle 21 to be positioned on the drive spindle 20. Thus, faulty engagement due to low surface precision of the conventional center core 10 is reduced. Therefore, the material utilization rate of the center core 10 is improved, and manufacturing costs thereof can be reduced.

Moreover, the chucking mechanism of the present invention has another effect that the parallelism is not reduced even when foreign matter is sandwiched between the center core 10 and the drive spindle 20.

Figure 3:
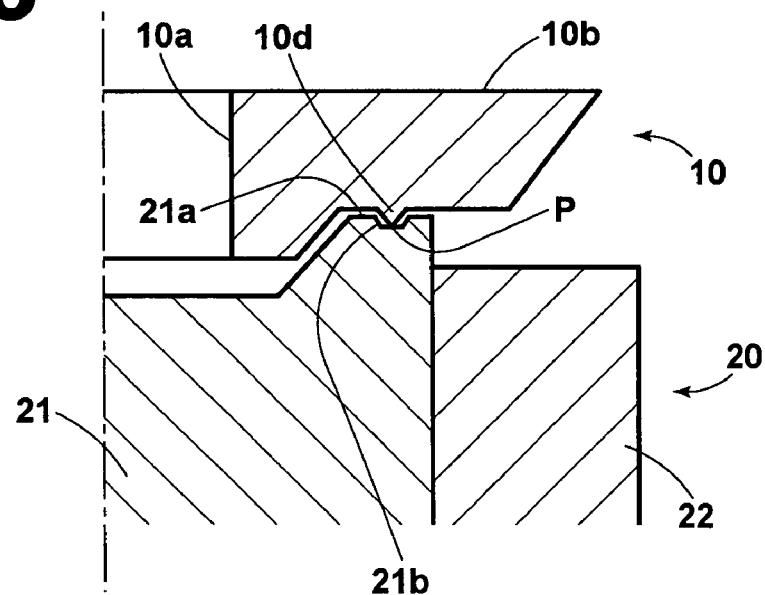
FIG. 3 is an enlarged sectional view of an essential part showing another embodiment of the present invention in contrast with FIG. 2.
Figure 4:
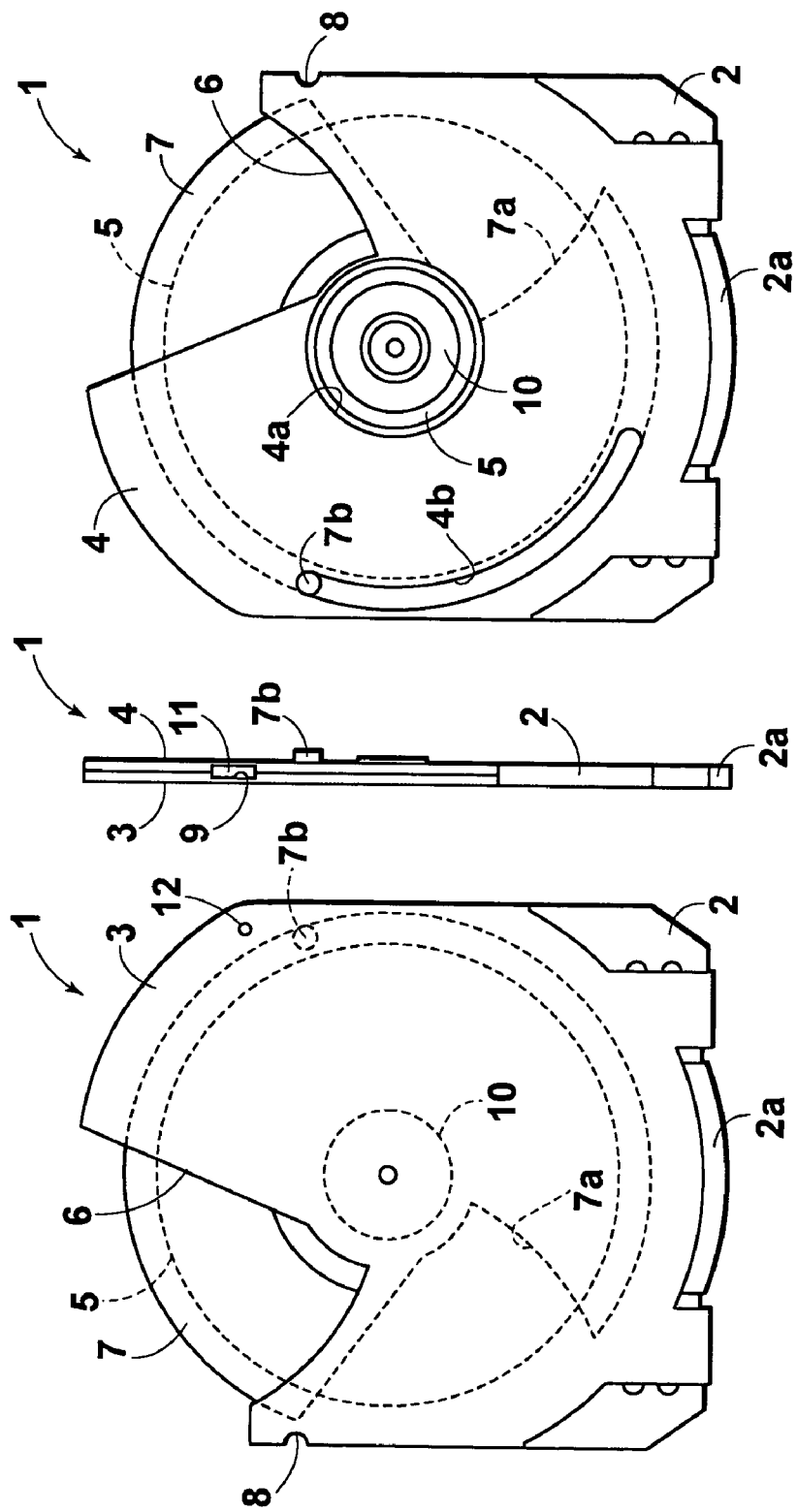
FIGS. 4A to 4C are a plan view, a right side view, a rear view showing an example of a constitution of a conventional disk cartridge, respectively.

FIG. 3 is an enlarged sectional view of an essential part showing another embodiment of the present invention in contrast with FIG. 2. In the present embodiment, a center core 10 has the same constitution as in FIGS. 1 and 2, except for the following: dents 21b are provided on an upper surface 21a of a main body of a spindle 21 of a drive spindle 20 to receive the protrusions 10d of the center core 10; and lower ends P of the protrusions 10d are in point contact with the bottom surfaces of the dents 21b.

According to the constitution shown in FIG. 3, it is possible to prevent positional displacement of the center core on the drive spindle 20, in addition to the aforementioned effects of the constitution shown in FIG. 2.

What is claimed is:

1. A chucking mechanism of a center core in a disk cartridge to receive a drive spindle, comprising:
    a disk, operable to serve as a recording medium;
    a housing of the disk cartridge rotatably housing the disk; and
    the center core, fixed to the center of the disk,
    wherein the center core is of the type that is employed in a disk drive provided with the drive spindle,
    wherein the center core is positioned on the drive spindle upon chucking in a state where the center core is in point contact with the drive spindle at a minimum of three spots, and
    wherein a minimum of three protrusions are provided on a bottom surface of the center core, and lower ends of the protrusions are in point contact with an upper surface of the drive spindle.

2. The chucking mechanism of a center core according to claim 1, further comprising dents formed on an upper surface of the drive spindle to receive the minimum of three protrusions.

3. A chucking mechanism of a center core in a disk cartridge to receive a drive spindle, comprising:
    a disk, operable to serve as a recording medium;
    a housing of the disk cartridge rotatably housing the disk; and
    the center core, fixed to the center of the disk,
    wherein the center core is of the type that is employed in a disk drive provided with the drive spindle, and
    wherein the center core is positioned on the drive spindle upon chucking in a state where the center core is in point contact with the drive spindle at a minimum of three spots,
    further comprising a minimum of three protrusions provided on the drive spindle.

4. A chucking mechanism of a center core in a disk cartridge to receive a drive spindle, comprising:
    a disk, operable to serve as a recording medium;
    a housing of the disk cartridge rotatably housing the disk; and
    the center core, fixed to the center of the disk; and
    wherein the center core is of the type that is employed in a disk drive provided with the drive spindle, and
    means for positioning the center core on the drive spindle upon chucking in a state where the center core is in point contact with the drive spindle at a minimum of three spots.

* * * * *